Oct. 10, 1967  J. W. ROBERTS ETAL  3,346,198
UNIFORM LIGHTWEIGHT AGGREGATE
Filed March 29, 1965
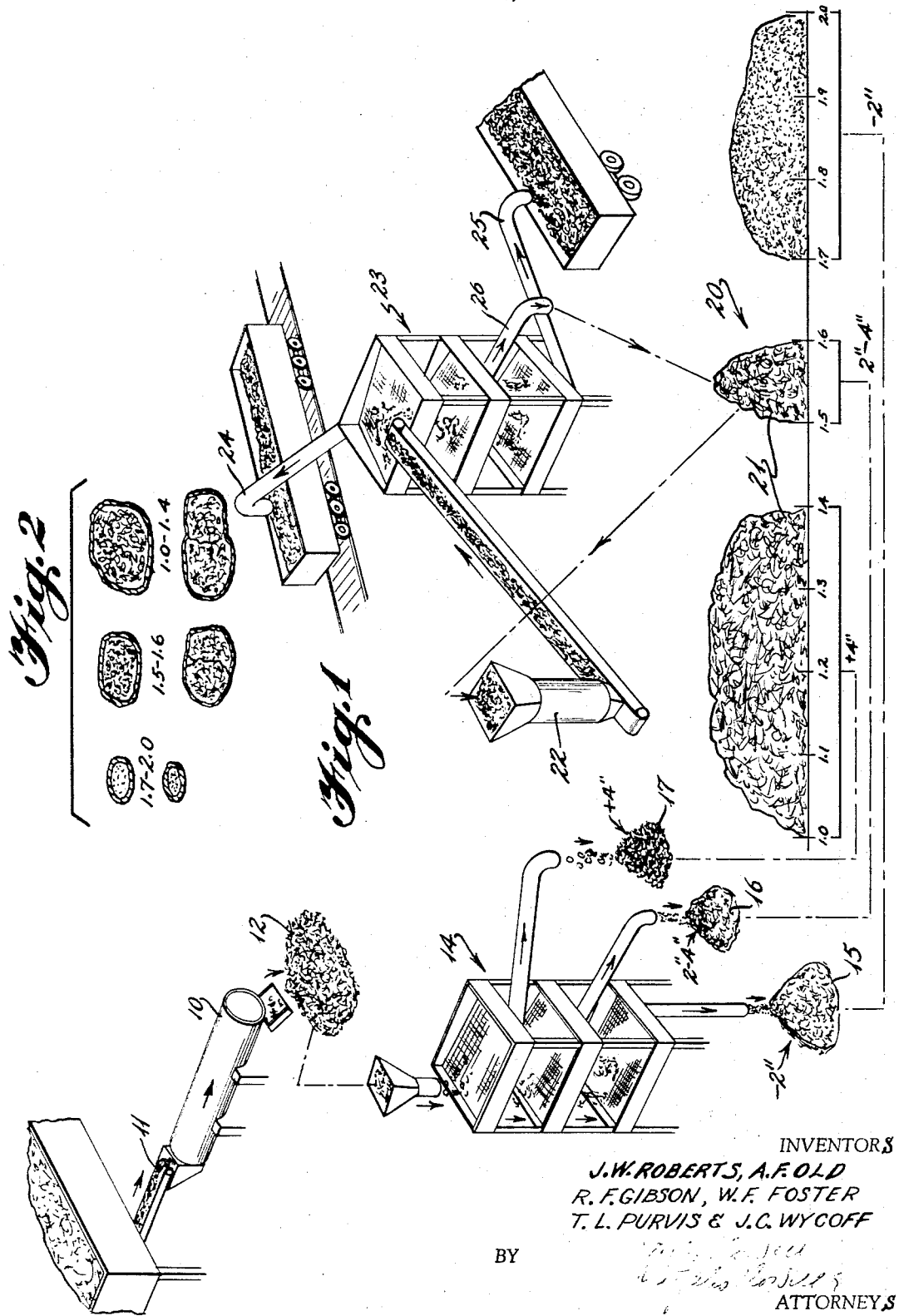
INVENTORS
J. W. ROBERTS, A. F. OLD
R. F. GIBSON, W. F. FOSTER
T. L. PURVIS & J. C. WYCOFF
BY
ATTORNEYS 3,346,198
UNIFORM LIGHTWEIGHT AGGREGATE
John W. Roberts, Albert F. Old, and Richard F. Gibson, Richmond, Willard F. Foster, New Canton, and Thomas L. Purvis and John C. Wycoff, Richmond, Va., assignors to Solite Corporation, Richmond, Va.
Filed Mar. 29, 1965, Ser. No. 443,430
4 Claims. (Cl. 241—23)

ABSTRACT OF THE DISCLOSURE

Expanded aggregate from a production process is continually separated according to particle size, the particles sampled from time to time to determine the specific gravity of the mass, and the sampled masses stockpiled in accordance with specific gravity.

---

This invention relates to lightweight aggregate and more particularly to the production of lightweight aggregates of improved uniformity.

In the production of lightweight aggregate from deposits of clay, shale, or slate such as described in the patent of A. F. Old et al., No. 2,721,069, the mined shale is heat treated in kilns, causing it to expand or bloat to form objects having an outer skin and a multiplicity of small air pockets therewithin. Heretofore, the practice has been to deposit such heat treated material onto a storage pile until cooled, following which it is crushed and separated into particles of specified size ranges. Some of the heat treated material has been used without crushing where larger sizes are demanded.

The aggregate to which reference is made is a structural or load-carrying aggregate, although it has been used for mere nonload-carrying purposes, including for insulation. As a load-carrying aggregate it is used in various structures, including on highways, bridges, and the floors, walls and roofs of buildings, being used in both monolithic and block concrete. In the various uses the specification varies, including size range and specific gravity. Heretofore, the size range has been determinable, but the specific gravity has sometimes varied to a larger extent than desired.

It has been known heretofore that raw material from a particular area which is of uniform size and receives uniform heat treatment will produce an aggregate having uniform specific gravity. However, if there are variations in the raw material or in the heat treatment, variations will result in the product.

The present invention permits the producer to supply a lightweight aggregate within close limits of specific gravity, even though there is nonuniformity in either the raw material or in the heat treatment.

The selection of the raw material and proper control of the heat treatment, including temperature, rate of movement in the kiln, and the application of heat and air thereto, is complex and dependent upon many elements, including observation and control by plant personnel. Such control involves the exercise of a constant, high degree of skill. In situations where the degree of such control may not be achieved to the extent desired, the present invention provides a relatively easy procedure by means of which a product of uniform specific gravity may be obtained.

The problems involved in the demand for product uniformity arise from industry demands, including the periodic raising of American Society for Testing Materials standards. In addition, increased competition among producers of lightweight aggregate has contributed. Lightweight aggregate is used in concrete in place of cheaper, denser materials and in order to justify its expense it must produce concrete of equal strength and without sacrificing cement economy. Additionally, the weight of the product must be predictable within narrow limits. Hence the density of the aggregate is of vital importance to both the producer and the consumer. Various approaches have been made to the problem.

The present invention contemplates a novel process after firing by means of which uniformity, especially of density, may be achieved.

Accordingly, it is an object of the present invention to provide a process by which the producer of lightweight aggregate of the type described may uniformly produce such aggregate in specified sizes and of specific gravity within close limits.

These and other objects of the invention will become apparent from the following description in conjunction with the accompanying drawing in which:

FIG. 1 is a schematic flow diagram illustrating the processing of material in accordance with the invention; and FIG. 2 is a diagrammatic section through uncrushed expanded aggregate of the type contemplated in the present invention.

Briefly stated the present invention provides for size separation of the material discharged from the kiln prior to crushing. It has been found that in the continuing operation of the kiln, batches of material of similar size, especially those discharged from a continuously controlled flow of substantially uniform material, tend to have substantially uniform specific gravity. Each uncrushed batch is sampled to determine its specific gravity and is placed in a location for product of its specific gravity. When a request is made for material of a particular size and specific gravity, such material is taken from that portion of the supply source corresponding to the desired specific gravity, crushed and graded for size to supply the order, and the unused material may be returned to the same portion of the supply depot.

With continued reference to the drawings, there is indicated a kiln 10 receiving raw material 11 and depositing it on a discharge pile 12 after appropriate heat treatment to cause it to expand as described, for example, in the patent of A. F. Old et al., No. 2,721,069. According to the practice prior to the present invention, material from the discharge pile would have then been crushed and then classified by size for ultimate use.

In accordance with the present invention, however, material from the discharge pile is taken to a classifier 14, in which the material is classified by size and separated into batch piles or bins of a desired number. The number of bins may vary, closer control being obtainable with a larger number. Three has been found satisfactory in one plant. The material in the various bins is sampled from time to time to determine its specific gravity. This may be done either by the batch or on a continuous flow method.

In the example, illustrative batch piles 15, 16 and 17 are shown. As indicated in the drawing, batch pile 15 is for material under 2 inches, batch pile 16 is for material 2 to 4 inches, and batch pile 17 is for material over 4 inches. Varying number of batch piles and varying classifications may be used, as stated, depending on a particular situation, and these are given for purposes of illustration only. Each of the batch piles accumulates materials of a relatively small amount, depending on the speed at which sampling takes place.

The specific gravity of the material in each batch pile is sampled. It is found that the larger size material tends to have a smaller specific gravity than the smaller size material. Thus, the material in batch pile 17 may run from 1.0 to 1.4, that in batch pile 16 from 1.5 to 1.6, and that in batch pile 15 from 1.7 to 2.0, such variation occurring from time to time. However, the material in a particular batch, having been produced from a relatively localized area of raw material and under substantially identical heat treatment, tends to have only a narrow variation in specific gravity. Hence, a testing or sampling of each batch is an accurate indication of the specific gravity of the entire batch.

Lightweight aggregate produced in a kiln under uniform conditions tends to be of uniform nature as indicated diagrammatically in FIG. 2, except that the sizes of the expanded objects varies and, hence, the ratio of the skin or vitrified material on the exterior to the interior mass varies depending on the size of the object. Therefore, the specific gravity of objects otherwise uniform varies with their size.

From the batches the material is deposited in a location corresponding to its specific gravity, as storage yard 20. The storage yard is laid out with indicia 21 indicating variation in specific gravity over the range anticipated, as for example 1.0 to 2.0, then material of a particular specific gravity from the batch piles is deposited in the portion of the storage yard corresponding to its specific gravity. The storage yard is large compared to the batch piles. For example, the capacity of a storage yard may be on the order of about 30 days' normal requirements at the plant.

When an order is received for aggregate of a particular size and specific gravity, material is taken from the portion of the storage yard in which material of that specific gravity is stored. Such material is fed to a crusher 22, then to a classifier 23, in which it is separated into crushed aggregate of the desired specification. Assuming that there is a demand for material of two size ranges, those are discharged from the classifier on flow paths 24, 25 into railway cars or other carriers. The remaining, unused crushed aggregate is carried by flow path 26 back to the portion of the storage yard from which the material was originally selected.

With the present invention it has been found that close control to obtain uniformity of product, particularly of specific gravity, is facilitated and made less dependent on the operators' skill and variations which may affect the product during its production. Although a uniform product has been obtainable heretofore during a substantial portion of an operation, the continual obtaining of uniformity has been difficult for the reasons given. The present invention permits the obtaining of close control and uniformity on a continuing basis despite variations which would otherwise affect such product.

Accordingly, it will be understood that the present invention includes the size classification of batches of aggregate received in a continuing operation, the determination of the specific gravity of the material in these batches, and the deposit of the batches in a predetermined location in accordance with their specific gravity. Material of a particular specific gravity is removed for crushing and classification. Excess or unsold crushed material is returned to the portion of the storage yard from which it was removed.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:
1. The method of producing crushed lightweight aggregate of predetermined size and specific gravity from raw material in the class comprising clay, shale, or slate, comprising mining the raw material, crushing and heat treating the raw material to provide an expanded product of discrete particles having an outer skin and an inner air-pocketed framework, depositing the expanded product on a discharge pile, permitting the expanded product to cool, continually classifying by size the expanded product received from the kiln, sampling the batches to determine their specific gravity, depositing the batches in a location indicative of the specific gravity of each, selecting the product of a particular specific gravity from the location having such product, crushing the product of the selected specific gravity, selecting the product of the desired size from the classifier, and returning any unselected portion of the crushed product to a location indicative of its specific gravity.

2. In the production of lightweight aggregate in which raw material is heat treated to cause it to expand into discrete bloated objects, the objects discharging continually from the heat treatment, the improvement comprising substantially continually separating the heat treated product from the kiln according to size, substantially continually sampling the separated material to determine its specific gravity, and substantially continually stockpiling material of similar specific gravity together from the separated materials.

3. In the production of lightweight aggregate product from clay, shale, or slate, and including producing an expanded product, the improvement comprising separating the expanded product, prior to crushing, into batches in which the particles of product within each batch are of substantially uniform size, determining the specific gravity of the product in each of the batches, depositing the product from each of the batches in a location with material of similar specific gravity, and crushing and selecting the desired size of the crushed particles from the material deposited from batches of the desired specific gravity.

4. In the production of lightweight aggregate, in which raw material is heat treated in a kiln and discharged therefrom in the form of bloated particulate material, the improvement comprising substantially continually segregating the material according to the particulate size, intermittently determining the specific gravity of such segregated material, and combining segregated materials of similar specific gravity but without regard to particulate size, whereby a stockpile of uniform specific gravity is provided.

References Cited
UNITED STATES PATENTS

| | | | |
|---|---|---|---|
| 2,307,064 | 1/1943 | Patterson | 241—24 |
| 2,373,635 | 4/1945 | Wuensch | 241—24 |
| 2,501,962 | 3/1950 | Pierce | 263—21 X |
| 2,639,132 | 5/1953 | Bradford | 263—21 |
| 2,642,273 | 6/1953 | Dube | 263—21 X |
| 2,721,069 | 10/1955 | Old | 263—21 |
| 2,803,587 | 8/1957 | Jung | 241—23 X |
| 2,807,453 | 9/1957 | Pierce | 263—21 |

WILLIAM W. DYER, JR., *Primary Examiner.*

HARRY F. PEPPER, JR., *Examiner.*